US012709053B2

(12) United States Patent
Yamazaki et al.

(10) Patent No.: US 12,709,053 B2
(45) Date of Patent: Aug. 18, 2026

(54) IMPRINT MOLD, METHOD FOR MANUFACTURING THE SAME AND METHOD FOR MANUFACTURING REPRODUCED IMPRINT MOLD

(71) Applicants: Shin-Etsu Chemical Co., Ltd., Tokyo (JP); TOHOKU UNIVERSITY, Sendai (JP)

(72) Inventors: Hiroyuki Yamazaki, Joetsu (JP); Masao Ando, Joetsu (JP); Masaki Takeuchi, Joetsu (JP); Masaru Nakagawa, Sendai (JP); Shunya Ito, Sendai (JP)

(73) Assignees: SHIN-ETSU CHEMICAL CO., LTD., Tokyo (JP); TOHOKU UNIVERSITY, Sendai (JP)

( * ) Notice: Subject to any disclaimer, the term of this patent is extended or adjusted under 35 U.S.C. 154(b) by 0 days.

(21) Appl. No.: 17/857,238

(22) Filed: Jul. 5, 2022

(65) Prior Publication Data

US 2023/0027061 A1 Jan. 26, 2023

(30) Foreign Application Priority Data

Jul. 6, 2021 (JP) ................................ 2021-112078

(51) Int. Cl.
*B29C 59/02* (2006.01)
*B29C 33/38* (2006.01)
*B29C 33/56* (2006.01)

(52) U.S. Cl.
CPC ........ *B29C 59/022* (2013.01); *B29C 33/3842* (2013.01); *B29C 33/56* (2013.01); *B29K 2995/0097* (2013.01)

(58) Field of Classification Search
CPC ..................................................... G03F 7/0002
See application file for complete search history.

(56) References Cited

U.S. PATENT DOCUMENTS

2004/0029041 A1* 2/2004 Shih .................... H01L 21/3086 264/494
2006/0040058 A1* 2/2006 Heidari ................. G03F 7/0002 427/256
2006/0256447 A1* 11/2006 Dodoc ..................... G02B 3/12 359/649
2009/0092791 A1* 4/2009 Terasaki ................ B81C 99/009 264/40.5
2009/0242509 A1 10/2009 Nishikawa
(Continued)

FOREIGN PATENT DOCUMENTS

JP 2008-221538 A 9/2008
JP 2009263815 A * 11/2009
(Continued)

OTHER PUBLICATIONS

JP 2018032875 A, EPO English translation (Year: 2018).*
(Continued)

*Primary Examiner* — Susan D Leong
(74) *Attorney, Agent, or Firm* — Birch, Stewart, Kolasch & Birch, LLP

(57) ABSTRACT

An imprint mold having a synthetic quartz glass substrate having a transfer fine pattern formed on a surface thereof; and a coating layer formed on at least a part of the fine pattern by at least one of materials different from the substrate.

15 Claims, 1 Drawing Sheet

| | Z1 [nm] | Z2 [nm] | HEIGHT DIFFERENCE [nm] | DISTANCE [nm] | ANGLE DIFFERENCE |
|---|---|---|---|---|---|
| ▪ | 25.37 | 140.78 | 115.4048 | 116.81 | 44.7 |
| ▪ | 19.20 | 132.47 | 113.2728 | 97.34 | 49.3 |
| □ | 21.80 | 137.62 | 115.8181 | 97.34 | 50.0 |
| ▪ | | | | | |
| ▪ | | | | | |

(56) References Cited

U.S. PATENT DOCUMENTS

| | | | | |
|---|---|---|---|---|
| 2010/0128240 | A1* | 5/2010 | Epple | G02B 27/0025 359/364 |
| 2012/0201969 | A1 | 8/2012 | Fletcher et al. | |
| 2013/0323431 | A1* | 12/2013 | Horibe | B08B 7/04 15/301 |
| 2014/0346142 | A1* | 11/2014 | Chapuis | C08J 7/02 216/62 |
| 2016/0059617 | A1* | 3/2016 | Kang | G03F 7/0002 430/320 |
| 2017/0252962 | A1 | 9/2017 | Yamada et al. | |
| 2018/0348629 | A1* | 12/2018 | Liu | G03F 7/0002 |
| 2019/0196324 | A1* | 6/2019 | Bamesberger | G03F 7/0002 |

FOREIGN PATENT DOCUMENTS

| | | | | |
|---|---|---|---|---|
| JP | 2014-124873 | A | | 7/2014 |
| JP | 2018-32875 | A | | 3/2018 |
| JP | 2018032875 | A | * | 3/2018 |
| JP | 2020-170863 | A | | 10/2020 |
| KR | 20080023474 | A | * | 3/2008 |
| WO | WO 2012/018048 | A1 | | 2/2012 |

OTHER PUBLICATIONS

Sheila Reynolds, “Quartz vs. Fused Silica: What’s the Difference?”, Sep. 8, 2015, Swift Glass (Year: 2015).*

Kim et al., KR-20080023474-A, English translation (Year: 2008).*

Machine translation of JP2009263815 (Year: 2009).*

Extended European Search Report for European Application No. 22182763.7, dated Dec. 8, 2022.

English translation of JP 2008-221538 A, published Sep. 25, 2008.

English translation of JP 2014-124873 A, published Jul. 7, 2014.

Japanese Office Action for Japanese Application No. 2021-112078, dated Jan. 21, 2025, with an English translation.

* cited by examiner

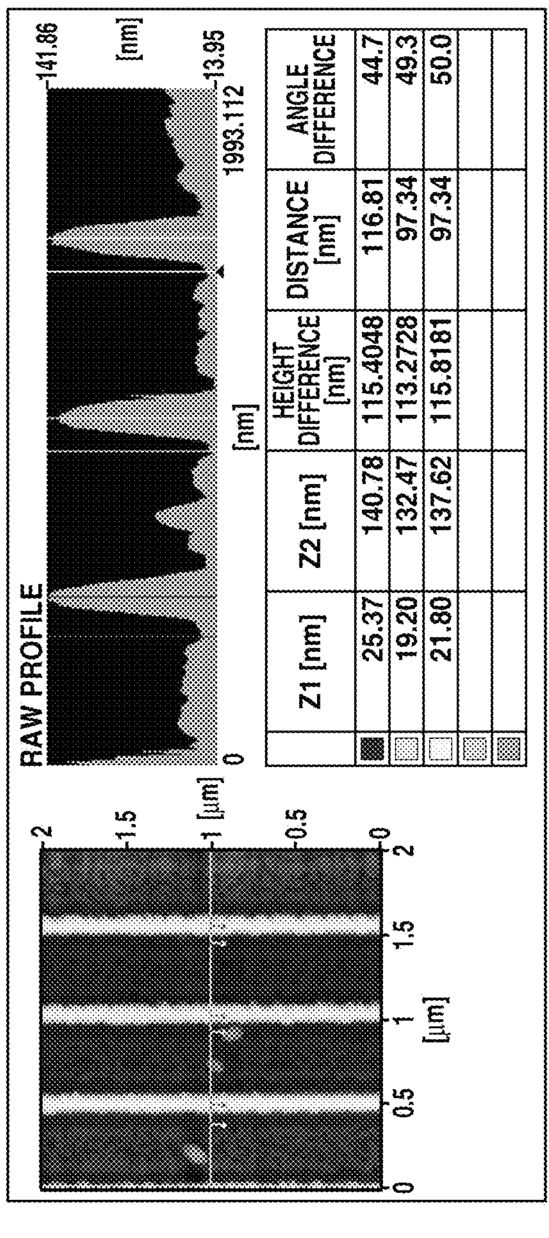
| | Z1 [nm] | Z2 [nm] | HEIGHT DIFFERENCE [nm] | DISTANCE [nm] | ANGLE DIFFERENCE |
|---|---|---|---|---|---|
| | 25.37 | 140.78 | 115.4048 | 116.81 | 44.7 |
| | 19.20 | 132.47 | 113.2728 | 97.34 | 49.3 |
| | 21.80 | 137.62 | 115.8181 | 97.34 | 50.0 |
| | | | | | |
| | | | | | |

IMPRINT MOLD, METHOD FOR MANUFACTURING THE SAME AND METHOD FOR MANUFACTURING REPRODUCED IMPRINT MOLD

CROSS-REFERENCE TO RELATED APPLICATION

This non-provisional application claims priority under 35 U.S.C. § 119(a) on patent application No. 2021-112078 filed in Japan on Jul. 6, 2021, the entire contents of which are hereby incorporated by reference.

TECHNICAL FIELD

The present invention relates to an imprint mold, a method for manufacturing the same, and a method for manufacturing a reproduced imprint mold.

BACKGROUND ART

An imprint technique, which has become active in recent years and is one of alternative techniques for photolithography, is considered to be advantageous from the viewpoint of being able to transfer a pattern faithful to the shape of a mold to be used as a mold, device cost, and the like.

There are roughly two types of imprint. One is thermal imprint and the other is optical imprint. The former is a method of transferring a pattern to a material to be transferred by pressing a mold pattern against a material to be transferred and applying heat and pressure. The latter is a method of pressing a mold pattern against a photocurable material and transferring the pattern by light irradiation.

In general, the thermal imprint can be performed with a relatively simple and inexpensive material and device, but applied pressure is high, and there is a limit in pattern size and accuracy due to thermal expansion and contraction. On the other hand, in the optical imprint, applied pressure is low, dimension control at the time of pattern transfer can be performed with high accuracy, so that the imprint is selectively used according to the application.

In addition to the above-described difference in method, various materials such as resin, metal, glass and ceramics are selectively used for the imprint mold from the viewpoint of transfer accuracy and durability required for the target device. In addition, a chemical treatment for enhancing releasability is performed as necessary.

Patent Document 1 proposes an imprint mold having a concave-convex patterns formed of a resin. The resin is advantageous in that it can be easily manufactured even in the case of an imprint mold having a concave-convex patterns of a complicated shape. Although an imprint mold having a concave-convex patterns formed of a resin has a problem that the concave-convex patterns collapse due to low chemical (solvent) resistance and strength, it has been reported that the problem can be solved by adjusting the gel fraction of the resin or forming a coating layer on the concave-convex patterns.

Further, Patent Document 2 has proposed a mold for imprint formed of a resin having no transfer defect and excellent releasability. The imprint mold has an oxide layer and a release agent layer formed on the oxide layer on a surface of a substrate formed of a resin, but there is a problem that the oxide layer and the release agent layer are integrated and transferred to a transferred resin film. In order to solve this problem, Patent Document 2 has reported that reactivity of the resin contained in the imprint mold is controlled.

CITATION LIST

Patent Document 1: JP-A 2020-170863
Patent Document 2: WO 2012/018048

SUMMARY OF THE INVENTION

Meanwhile, in general, in a fine pattern requiring high accuracy, optical imprint using UV light as a light source is selected, and synthetic quartz glass is selected as a material of a mold. This is because the mold formed of synthetic quartz glass is superior in strength, hardness, dimensional stability and the like of the concave-convex patterns to the molds made of resin described in Patent Documents 1 and 2.

However, even in the mold formed of synthetic quartz glass, as the concave-convex patterns became finer, a defect due to breakage of the pattern sometimes occurred.

The present invention has been made in view of the above circumstances, and it is an object of the present invention is to provide an imprint mold in which synthetic quartz glass is selected as an essential material and a fine pattern requiring high accuracy is provided, the imprint mold being capable of preventing breakage caused by the fine pattern, and in a case where a coating layer was formed on the pattern, the coating layer can be easily removed even if foreign matter or the like is caught or contaminated in the pattern, and the imprint mold can be reproduced by forming a new coating layer.

As a result of intensive studies to achieve the above object, the inventors have found that the strength of a mold pattern portion can be improved by coating at least a part of a portion of an imprint mold formed of a synthetic quartz glass substrate where a transfer fine pattern is formed with a film of a material different from the substrate, and the coated film can be easily removed without damaging the mold pattern and can be re-coated, and have completed the present invention.

That is, the present invention provides the following imprint mold, a method for manufacturing the same, and a method for manufacturing a reproduced imprint mold.

1. An imprint mold having:
   - a synthetic quartz glass substrate having a transfer fine pattern formed on a surface thereof; and
   - a coating layer formed on at least a part of the fine pattern by at least one of materials different from the substrate.
2. The imprint mold according to 1, wherein the material different from the substrate is a metal, an inorganic oxide, or an inorganic nitride.
3. The imprint mold according to 1 or 2, wherein the coating layer has a thickness of 50 nm or less, and variation in thickness is within 10% of the average value of the thickness of the coating layer.
4. The imprint mold according to any one of 1 to 3, wherein the fracture strength of a portion of the transfer fine pattern where the coating layer is formed is higher than the fracture strength of the transfer fine pattern before the coating layer is formed.
5. The imprint mold according to 4, wherein the fracture strength of a portion of the transfer fine pattern where the coating layer is formed is 1.05 times or more of the fracture strength of the transfer fine pattern before the coating layer is formed.

6. A method for manufacturing the imprint mold according to any one of 1 to 5, wherein the coating layer is formed of a material different from the substrate by alternately exposing at least two kinds of reactive precursors serving as raw materials of a material different from the substrate to at least a part of the transfer fine pattern formed on the surface of the synthetic quartz glass substrate by sequential chemical vapor deposition to react these precursors.
7. A method for manufacturing a reproduced imprint mold, the method including the steps of:
   peeling off a coating layer from an imprint mold having a synthetic quartz glass substrate having a transfer fine pattern formed on a surface thereof and a coating layer formed on at least a part of the fine pattern by at least one of materials different from the substrate;
   cleaning the transfer fine pattern after the coating layer is peeled off;
   confirming that the shape and fracture strength of the transfer fine pattern before forming the coating layer are maintained for the cleaned transfer fine pattern; and
   forming a new coating layer on at least a part of the confirmed transfer fine pattern by atomic deposition using the same material as or a different material from the peeled coating layer.
8. The method for manufacturing a reproduced imprint mold according to 7, wherein the confirming is performed by time-of-flight secondary ion mass spectrometry or nanoindentation test.

ADVANTAGEOUS EFFECTS OF THE INVENTION

The imprint mold of the present invention can avoid or reduce damage to the pattern, particularly breakage to the fine pattern when foreign matter was mixed in the imprint process. In addition, it is possible to easily remove the coating layer formed on the pattern and reproduce a new coating layer.

BRIEF DESCRIPTION OF THE DRAWINGS

FIG. 1 is an atomic force microscope image of a line pattern obtained in Experimental Example 1.

DESCRIPTION OF THE PREFERRED EMBODIMENTS

Hereinafter, the present invention is described in more detail.

An imprint mold of the present invention has a synthetic quartz glass substrate having a transfer fine pattern formed on a surface thereof; and a coating layer formed on at least a part of the fine pattern by at least one of materials different from the synthetic quartz glass substrate.

[Imprint Mold]

As the synthetic quartz glass substrate used in the present invention, it is possible to use a synthetic quartz glass substrate obtained by molding a synthetic quartz glass ingot manufactured by reacting a silica raw material compound such as a silane compound or a siloxane compound with an oxyhydrogen flame into a desired shape, subjecting the molding to an annealing treatment, slicing it into a desired thickness, and then subjecting it to lapping, polishing of the outer periphery as necessary, followed by rough polishing, and precision polishing.

The shape of the synthetic quartz glass substrate is not particularly limited, but can be a quadrangular shape such as a rectangle, a circular shape or the like from the viewpoint of ease of manufacturing. For example, a substrate with a side length of 10 to 300 mm is suitably used for a quadrangular substrate, and a substrate with a diameter of 10 to 300 mm is suitably used for a circular glass substrate.

The thickness of the synthetic quartz glass substrate is appropriately selected and not particularly limited, but is preferably thin from the viewpoint of transmittance, and on the other hand, a certain thickness is required from the viewpoint of strength, self-weight deformation, and handling, and the thickness is preferably 10 μm or more, more preferably 50 μm or more, still more preferably 100 μm or more, and is preferably 300 mm or less, more preferably 100 mm or less, still more preferably 30 mm or less.

In the present invention, examples of the fine pattern include a line pattern, a nano pillar pattern, and a 3D pattern. The size and shape are not particularly limited, but examples of the line pattern include a simple linear shape, a bent shape with an angle, an R shape with a curvature, a branched shape, and a cross shape. In the case of the nano pillar pattern, examples thereof include a prismatic shape, a cylindrical shape, an elliptical columnar shape, a truncated pyramid shape, a truncated cone shape, an elliptical frustum shape, an inverted truncated pyramid shape, an inverted truncated cone shape, and an inverted elliptical frustum shape. Examples of the 3D pattern include a stepped shape such as a stair shape, a slope shape, and a shape having a partial spherical surface. The fine pattern may have one type of shape or a combination of a plurality of types of shapes.

The fracture strength of the substrate at the portion where the transfer fine pattern is formed is preferably 70 GPa or more, more preferably 75 GPa or more, from the viewpoint of formation, removal, and reproduction of the coating layer described later. In the present invention, the fracture strength can be determined by nanoindentation test. The nanoindentation test is a method of measuring the hardness and Young's modulus of a substrate by a pressing force and a depth when a hard indenter is pressed against the substrate. It can be said that the higher the Young's modulus, the higher the fracture strength.

In the imprint mold of the present invention, a coating layer formed of at least one of materials different from the synthetic quartz glass substrate is provided on at least a part of the transfer fine pattern. Since the coating layer is provided on the transfer fine pattern, the transfer fine pattern formed of synthetic quartz glass can be protected from contamination or deterioration, and the material is appropriately selected for the purpose. Among them, metals, inorganic oxides or inorganic nitrides are particularly preferable from the viewpoint of coating film thickness accuracy, strength, and the like.

Examples of the metal include simple metals such as Cr, Cu, Mo, and Ni, and alloys containing these metals. Examples of the inorganic oxide include $Al_2O_3$, $ZrO_2$, and $HfO_2$. Examples of the inorganic nitride include TiN, TaN, and WN. Among them, alumina ($Al_2O_3$) is preferable from the viewpoint of performance, coating stability, and versatility of the coating film.

The thickness of the coating layer is not particularly limited, but is preferably 50 nm or less, more preferably 10 nm or less. The lower limit is not particularly limited, but is preferably 0.1 nm or more, more preferably 1 nm or more. It is preferable that the thickness is in the above-mentioned range from the viewpoint of not only strength variation of the pattern including the coating layer but also the reliability of the dimension of the fine pattern.

Also, variation in thickness (maximum value of thickness-minimum value of thickness) is preferably within 10% of the average thickness of the coating layer. When the variation in thickness is in the above-mentioned range, good results can be obtained in terms of strength stability and reproducibility.

The hardness of the coating layer is preferably higher from the viewpoint of protecting and reinforcing the fine pattern of the synthetic quartz glass, and specifically, for example, the coating layer preferably has a Mohs hardness of 6 or more.

Furthermore, by providing the coating layer, the fracture strength of the portion where the transfer fine pattern is formed can be favorably improved. When the fracture strength of the transfer fine pattern portion before the coating layer is provided is, for example, 73 GPa, the fracture strength of the transfer fine pattern portion provided with the coating layer is preferably 77 GPa or more, more preferably 80 GPa or more. By providing the coating layer, the fracture strength of the transfer fine pattern portion can be increased preferably 1.05 times or more, more preferably 1.1 times or more as compared with that before providing the coating layer, and it is effective not only from the viewpoint of preventing pattern breakage due to hard foreign matter but also from the viewpoint of suppressing pattern deformation at the time of imprint.

In the present invention, the coating layer is formed so as to cover at least a part of the transfer fine pattern, but from the viewpoint of improving the strength, the coating layer is preferably formed so as to cover the entire fine pattern, and more preferably formed so as to cover the entire surface on which the fine pattern is formed.

Since the imprint mold of the present invention having the transfer fine pattern provided with such a coating layer can avoid or reduce damage to the fine pattern, particularly breakage of the fine pattern when foreign matter was mixed, it is possible to realize high accuracy and a long life in each stage as compared with the conventional imprint mold.

In the imprint mold of the present invention, even when the fine pattern provided with the coating layer is contaminated for some reason, the coating layer can be easily reproduced by the method described later, so that the life can be expected to be prolonged also in this respect.

[Method for Manufacturing Imprinted Mold]

[1] Method for Forming Fine Pattern

In the imprint mold of the present invention, the fine pattern formed on the surface of the synthetic quartz glass substrate can be produced by a lithographic method such as electron beam lithography, photolithography, or nanoimprint lithography.

Specifically, for example, the fine pattern can be produced by a method including the following steps.

(1) Forming an inorganic film on the surface of the synthetic quartz glass substrate on which a fine pattern is to be formed (first step)
(2) Forming an organic film on the inorganic film (second step)
(3) Patterning the organic film to form an organic film pattern on the inorganic film (third step)
(4) Forming an inorganic film pattern by etching the inorganic film using the pattern of the organic film as an etching mask (fourth step)
(5) Etching a surface portion of the synthetic quartz glass substrate using the organic film pattern and the inorganic film pattern or the inorganic film pattern as an etching mask to form a fine pattern (fifth step)
(6) Removing the organic film pattern and the inorganic film pattern, or the inorganic film pattern (sixth step)

(1) First Step

In the first step, an inorganic film is usually formed on the entire surface of the synthetic quartz glass substrate on which the fine pattern is to be formed. Examples of the inorganic film include a metal film and a film of a metal compound such as a metal nitride, a metal oxide, a metal carbide, a metal nitride oxide, a metal nitride carbide, a metal oxide carbide, or a metal nitride oxide carbide. The metal film may be a single film or an alloy film. In addition, the metal of the metal compound film may be only one kind or a combination of two or more kinds. Specific examples of a metal constituting the metal film and the metal compound film include Ag, Al, Au, Cr, Cu, Mo, Ni, Ru, Si, Ta, Ti, and W. Among them, a Cr film, an Si film, a Cr compound film, and an Si compound film are preferable from the viewpoint of ease of etching in the etching of the inorganic film in the fourth step, specific examples of the Cr compound include CrN, CrO, CrNO, and CrNOC (these formulas represent constituent elements of the compound, and the ratio of each element is arbitrary), and specific examples of the Si compound include SiN (this formula represents the constituent elements of the compound, and the ratio of each element is arbitrary).

The inorganic film has a thickness of preferably 200 nm or less, more preferably 50 nm or less, and preferably 2 nm or more from the viewpoint of preventing reversal of miniaturization due to an increase in pattern width and obtaining a sufficient strength improving effect.

The inorganic film can be formed by sputtering. Specifically, using a metal target, a metal compound target or the like as a target, and using a rare gas such as argon gas, and a reactive gas such as an oxygen-containing gas, a nitrogen-containing gas or a carbon-containing gas as necessary, as sputtering gas, an inorganic film is formed on the synthetic quartz glass substrate by a sputtering device. A power source may be either direct current or alternating current, but when a direct current power source is used, it is preferable to apply a measure for suppressing generation of an arc.

(2) Second Step

In the second step, an organic film is formed on the inorganic film. In the second step, the organic film is formed on a part or the whole of the surface of the inorganic film.

As a material of the organic film, a resist material (photoresist material) sensitive to a desired activation energy ray such as an electron beam, an X-ray, an ultraviolet ray, an excimer laser (ArF, KrF, or the like), or a high-pressure mercury lamp (i-line, g-line, or the like) is suitable. As the resist material, either a positive resist material or a negative resist material can be used, but a positive resist material is preferable from the viewpoint of accuracy and environmental aspects.

The thickness of the organic film can be selected in the range of 10 nm to several 10 μm, but a thin film is preferable from the viewpoint of resolution, and a thick film is preferable from the viewpoint of etching resistance. If both are considered in total, the thickness is preferably about 0.5 to 5 μm when wet etching is adopted for etching of the surface portion of the synthetic quartz glass substrate in the fifth step, and is preferably about 10 to 500 nm when dry etching is adopted.

The organic film can be formed by coating by spin coating, spray coating, slit coating, stencil printing, or the like, and spin coating is suitable for more uniform coating.

In the spin coating, rotary coating is performed at a maximum rotation speed of 2,000 to 4,000 rpm, and baking (pre-baking) is performed after coating. The pre-baking temperature depends on the type of the material of the organic film, but is preferably about 80 to 120° C.

(3) Third Step

In the third step, the organic film is patterned to form an organic film pattern on the inorganic film. Examples of the method for forming the organic film pattern include a method by electron beam lithography or photolithography, and a method by nanoimprint lithography.

In the method by electron beam lithography, an organic film pattern can be formed by drawing the organic film formed on the inorganic film using an electron beam lithography device and developing a pattern drawn on the organic film.

In addition, in the method by photolithography, an organic film pattern can be formed by exposing the organic film formed on the inorganic film using a photomask having a predetermined light shielding portion and a predetermined non-light shielding portion, and developing a pattern transferred to the organic film.

The liquid to be used for development may be appropriately selected according to the type of the resist material, and as the developer, for example, an alkali aqueous solution such as tetramethylammonium hydroxide (TMAH), a xylene-based organic solvent or the like can be suitably used.

After the development, a rinsing treatment with pure water or the like is performed, and the remaining developer and components derived from the resist material dissolved in the developer are washed away and dried, whereby an organic film pattern can be formed on the inorganic film. After drying, post-baking may be performed for strengthening the organic film. The post-baking is preferably performed at a temperature and/or time at which the organic film is not exposed to light, and it is preferable to perform the post-baking at a temperature higher than the pre-baking temperature before exposure (for example, 130° C. or higher).

In the method by nanoimprint lithography, a concave-convex structure portion of an imprint mold having a predetermined concave-convex patterns is pressed against the organic film to fill recesses of the mold with a resist material, and an upper surface of the resist material is molded so as to have a shape of the concave-convex patterns, the organic film is cured in this state, and then the imprint mold is separated from the cured organic film, whereby an organic film pattern can be formed.

The concave-convex structure portion of the imprint mold is preferably pressed against the organic film under a helium gas atmosphere or an easily condensable gas atmosphere. The easily condensable gas atmosphere is an atmosphere of a gas that is easily liquefied by pressing when the gas is confined in a mold gap, and bubble defects are less likely to occur in such an atmosphere. Specific examples of such a gas include 1,1,1,3,3-pentafluoropropane (PFP, HFC-245fa) and trans-1,3,3,3-tetrafluoropropene (TFP). If air bubbles are generated between the surface of the concave-convex structure portion of the imprint mold and the resist material, pattern defects may be generated in the organic film pattern. However, under a helium atmosphere or an easily condensable gas atmosphere, the helium gas or easily condensable gas constituting the air bubbles is dissolved in the resist material, and generation of pattern defects can be prevented.

As a method for curing the organic film, a method corresponding to a curing type of a material constituting the organic film may be adopted. For example, when the organic film material is of an ultraviolet curing type, a method of irradiating the organic film with ultraviolet light through the imprint mold or the like may be adopted.

After the imprint mold is separated from the cured organic film, the organic film usually remains at a position where the organic film is in contact with a projection of the imprint mold with a corresponding thickness (for example, 1 nm or more, particularly 5 nm or more, and 20 nm or less, particularly 10 nm or less), but this remaining portion is preferably removed before the synthetic quartz glass substrate is etched. The method of removing the remaining portion is not particularly limited, and examples thereof include ashing treatment with oxygen plasma, UV ozone treatment with ultraviolet light, and VUV treatment with vacuum ultraviolet light.

(4) Fourth Step

In the fourth step, a portion of the inorganic film exposed by removing the organic film is selectively removed to form an inorganic film pattern (hard mask pattern). Etching is suitable for selective removal of the inorganic film.

The etching may be either a wet process or a dry process, but in the case of the wet process, etching is performed using an etchant corresponding to the type of the inorganic film. Specific examples of the wet process include wet etching using a Cr etchant (diammonium cerium nitrate aqueous solution) when the inorganic film is Cr or a Cr compound. The concentration of the Cr etchant is not particularly limited, but is preferably 5 to 20% by weight.

On the other hand, in the case of the dry process, anisotropic etching is suitable. Specific examples of the dry process include argon ion milling, and dry etching with a reactive gas such as $CF_4$, $C_3F_6$, $C_3F_8$, $C_4F_8$, $C_5F_8$, or $CHF_3$.

After the selective removal of the inorganic film, an organic film pattern usually remains on the inorganic film pattern. However, the fifth step may be performed while the remaining organic film pattern remains on the inorganic film pattern, or the fifth step may be performed after the organic film pattern is removed from the inorganic film pattern.

(5) Fifth Step

In the fifth step, after the inorganic film was selectively removed in the fourth step, when the organic film pattern was left, the surface portion of the synthetic quartz glass substrate is etched using the organic film pattern and the inorganic film pattern (hard mask pattern) as etching masks, and when the organic film pattern was removed, the surface portion of the synthetic quartz glass substrate is etched using the inorganic film pattern (hard mask pattern) as an etching mask to form a fine pattern. In this etching, a portion where the surface of the synthetic quartz glass substrate is exposed, which is not covered with the organic film pattern and the inorganic film pattern or the inorganic film pattern, is etched (engraved), and a portion covered with the pattern remains without being etched, so that a fine pattern is formed.

The method of etching the synthetic quartz glass substrate is not particularly limited, and examples thereof include wet etching in which the synthetic quartz glass substrate is immersed in an etching aqueous solution containing hydrofluoric acid or sodium fluoride, and dry etching with a reactive gas such as $CF_4$, $C_3F_6$, $C_3F_8$, $C_4F_8$, $C_5F_8$, or $CHF_3$.

(6) Sixth Step

In the sixth step, after the inorganic film was selectively removed in the fourth step, when the organic film pattern was left, the organic film pattern and the inorganic film pattern are removed, and when the organic film pattern was removed, the inorganic film pattern is removed. The organic film pattern can be removed simultaneously with the inorganic film pattern, and the inorganic film pattern can be removed by etching.

The etching may be either a wet process or a dry process, but in the case of the wet process, etching is performed using an etchant corresponding to the type of the inorganic film. Specific examples of the wet process include wet etching using a Cr etchant (diammonium cerium nitrate aqueous solution) when the inorganic film is Cr or a Cr compound. The concentration of the Cr etchant is not particularly limited, but is preferably 5 to 20% by weight.

On the other hand, in the case of the dry process, anisotropic etching is suitable. Specific examples of the dry process include argon ion milling, and dry etching with a reactive gas such as $CF_4$, $C_3F_6$, $C_3F_8$, $C_4F_8$, $C_5F_8$, or $CHF_3$.

So far, as the method for producing a fine pattern, the method in which the inorganic film is first formed on the synthetic quartz glass substrate and the organic film is further formed has been described as an example, but the method is not limited to these embodiments.

The fine pattern can also be produced by, for example, a so-called lift-off method in which an organic film is first formed on a synthetic quartz glass substrate, the organic film is patterned to form an organic film pattern, and then an inorganic film is further formed.

Specifically, for example, the fine pattern can be produced by a method including the following steps.

(11) Forming an organic film on the surface of the synthetic quartz glass substrate on which the fine pattern is to be formed (eleventh step)
(12) Patterning the organic film to form an organic film pattern on the surface of the synthetic quartz glass substrate on which the fine pattern is to be formed (twelfth step)
(13) Forming an inorganic film on the organic film pattern and the surface of exposed synthetic quartz glass substrate (thirteenth step)
(14) Removing the organic film pattern together with the inorganic film formed on the pattern of the organic film (fourteenth step)
(15) Etching a surface portion of the synthetic quartz glass substrate using the inorganic film pattern drawn by the inorganic film formed on the surface of the synthetic quartz glass substrate as an etching mask to form a fine pattern (fifteenth step)
(16) Removing the inorganic film pattern (sixteenth step)

(11) Eleventh Step

In the eleventh step, an organic film is formed on a part or the whole of the surface of the synthetic quartz glass substrate on which the fine pattern is to be formed.

As a material of the organic film, a resist material (photoresist material) sensitive to a desired activation energy ray such as an electron beam, an X-ray, an ultraviolet ray, an excimer laser (ArF, KrF, or the like), or a high-pressure mercury lamp (i-line, g-line, or the like) is suitable. As the resist material, either a positive resist material or a negative resist material can be used, but a positive resist material is preferable from the viewpoint of accuracy and environmental aspects.

The film thickness of the organic film can be selected in the range of 10 nm to several 10 μm, but a thin film is preferable from the viewpoint of resolution, and it is preferable that the organic film is sufficiently thicker than the inorganic film described later (for example, the thickness is twice or more larger than that of the inorganic film) from the viewpoint of removing the organic film pattern together with the inorganic film in the fourteenth step.

The organic film can be formed by coating by spin coating, spray coating, slit coating, stencil printing, or the like, and spin coating is suitable for more uniform coating. In the spin coating, rotary coating is performed at a maximum rotation speed of 2,000 to 4,000 rpm, and baking (pre-baking) is performed after coating. The pre-baking temperature depends on the type of the material of the organic film, but is preferably about 80 to 120° C.

(12) Twelfth Step

In the twelfth step, the organic film is patterned to form an organic film pattern on the surface of the synthetic quartz glass substrate on which the fine pattern is to be formed. Examples of the method for forming the organic film pattern include a method by electron beam lithography or photolithography, and a method by nanoimprint lithography.

In the method by electron beam lithography, an organic film pattern can be formed by drawing the organic film formed on the inorganic film using an electron beam lithography device and developing a pattern drawn on the organic film.

In addition, in the method by photolithography, an organic film pattern can be formed by exposing the organic film formed on the synthetic quartz glass substrate using a photomask having a predetermined light shielding portion and a predetermined non-light shielding portion, and developing a pattern transferred to the organic film.

The liquid to be used for development may be appropriately selected according to the type of the resist material, and as the developer, for example, an alkali aqueous solution such as tetramethylammonium hydroxide (TMAH), a xylene-based organic solvent or the like can be suitably used.

After the development, a rinsing treatment with pure water or the like is performed, and the remaining developer and components derived from the resist material dissolved in the developer are washed away and dried, whereby an organic film pattern can be formed on the synthetic quartz glass. After drying, post-baking may be performed for strengthening the organic film. Since the post-baking is performed at a temperature and/or time at which the organic film is not exposed to light, it is preferable to perform the post-baking at a temperature higher than the pre-baking temperature before exposure (for example, 130° C. or higher).

In the method by nanoimprint lithography, a concave-convex structure portion of an imprint mold having a predetermined concave-convex patterns is pressed against the organic film to fill recesses of the mold with a resist material, and an upper surface of the resist material is molded so as to have a shape of the concave-convex patterns, the organic film is cured in this state, and then the imprint mold is separated from the cured organic film, whereby an organic film pattern can be formed.

The concave-convex structure portion of the imprint mold is preferably pressed against the organic film under a helium gas atmosphere or an easily condensable gas atmosphere. The easily condensable gas atmosphere is an atmosphere of a gas that is easily liquefied by pressing when the gas is confined in a mold gap, and bubble defects are less likely to occur in such an atmosphere. Specific examples of such a gas include 1,1,1,3,3-pentafluoropropane (PFP, HFC-245fa) and trans-1,3,3,3-tetrafluoropropene (TFP). If air bubbles are generated between the surface of the concave-convex structure portion of the imprint mold and the resist material, pattern defects may be generated in the organic film pattern. However, under a helium atmosphere or an easily condensable gas atmosphere, the helium gas or easily condensable gas constituting the air bubbles is dissolved in the resist material, and generation of pattern defects can be prevented.

As a method for curing the organic film, a method corresponding to a curing type of a material constituting the organic film may be adopted. For example, when the organic film material is of an ultraviolet curing type, a method of irradiating the organic film with ultraviolet light through the imprint mold or the like may be adopted.

After the imprint mold is separated from the cured organic film, the organic film usually remains at a position where the organic film is in contact with a projection of the imprint mold with a corresponding thickness (for example, 1 nm or more, particularly 5 nm or more, and 20 nm or less, particularly 10 nm or less), but this remaining portion is preferably removed before the synthetic quartz glass substrate is etched. The method of removing the remaining portion is not particularly limited, and examples thereof include ashing treatment with oxygen plasma, UV ozone treatment with ultraviolet light, and VUV treatment with vacuum ultraviolet light.

(13) Thirteenth Step

In the thirteenth step, an inorganic film is usually formed on the entire surface of the organic film pattern and the exposed surface of the synthetic quartz glass substrate. Examples of the inorganic film include a metal film and a film of a metal compound such as a metal nitride, a metal oxide, a metal carbide, a metal nitride oxide, a metal nitride carbide, a metal oxide carbide, or a metal nitride oxide carbide. The metal film may be a single film or an alloy film. In addition, the metal of the metal compound film may be only one kind or a combination of two or more kinds. Specific examples of a metal constituting the metal film and the metal compound film include Ag, Al, Au, Cr, Cu, Mo, Ni, Ru, Si, Ta, Ti, and W. Among them, a Cr film, an Si film, a Cr compound film, and an Si compound film are preferable from the viewpoint of ease of etching in the etching of the inorganic film in the fourteenth step, specific examples of the Cr compound include CrN, CrO, CrNO, and CrNOC (these formulas represent constituent elements of the compound, and the ratio of each element is arbitrary), and specific examples of the Si compound include SiN (this formula represents constituent elements of the compound, and the ratio of each element is arbitrary).

The inorganic film has a thickness of preferably 200 nm or less, more preferably 50 nm or less, and preferably 10 nm or more.

The inorganic film can be formed by sputtering. Specifically, using a metal target, a metal compound target or the like as a target, and using a rare gas such as argon gas, and a reactive gas such as an oxygen-containing gas, a nitrogen-containing gas or a carbon-containing gas as necessary, as sputtering gas, an inorganic film is formed on the synthetic quartz glass substrate by a sputtering device. A power source may be either direct current or alternating current, but when a direct current power source is used, it is preferable to apply a measure for suppressing generation of an arc.

(14) Fourteenth Step

In the fourteenth step, the organic film pattern is removed together with the inorganic film formed on the pattern of the organic film, but if the organic film is formed to be sufficiently thicker than the inorganic film, the organic film pattern is removed from the side portion where the inorganic film is not formed in the pattern of the organic film, so that only the inorganic film formed on the pattern of the organic film in the inorganic film is removed. In this case, the organic film pattern can be removed with an alkaline aqueous solution such as tetramethylammonium hydroxide (TMAH), a xylene-based organic solvent, or the like.

(15) Fifteenth Step

In the fifteenth step, the surface portion of the synthetic quartz glass substrate is etched using an inorganic film pattern (hard mask pattern) drawn by an inorganic film formed on the surface of the synthetic quartz glass substrate as an etching mask to form a fine pattern. In this etching, a portion where the surface of the synthetic quartz glass substrate is exposed, which is not covered with the inorganic film pattern, is etched (engraved), and a portion covered with the pattern remains without being etched, so that a fine pattern is formed.

The method of etching the synthetic quartz glass substrate is not particularly limited, and examples thereof include wet etching in which the synthetic quartz glass substrate is immersed in an etching aqueous solution containing hydrofluoric acid or sodium fluoride, and dry etching with a reactive gas such as $CF_4$, $C_3F_6$, $C_3F_8$, $C_4F_8$, $C_5F_8$, or $CHF_3$.

(16) Sixteenth Step

In the sixteenth step, the inorganic film pattern is removed. The inorganic film pattern can be removed by etching.

The etching may be either a wet process or a dry process, but in the case of the wet process, etching is performed using an etchant corresponding to the type of the inorganic film. Specific examples of the wet process include wet etching using a Cr etchant (diammonium cerium nitrate aqueous solution) when the inorganic film is Cr or a Cr compound. The concentration of the Cr etchant is not particularly limited, but is preferably 5 to 20% by weight.

On the other hand, in the case of the dry process, anisotropic etching is suitable. Specific examples of the dry process include argon ion milling, and dry etching with a reactive gas such as $CF_4$, $C_3F_6$, $C_3F_8$, $C_4F_8$, $C_5F_8$, or $CHF_3$.

[2] Method for Forming Coating Layer

Next, a method for forming the coating layer on the fine pattern obtained as described above is described. In the present invention, a coating layer is formed on at least a part of the fine pattern with at least one of materials different from the synthetic quartz glass substrate.

Examples of the method for forming the coating layer on the fine pattern include sequential chemical vapor deposition, CVD, sputtering, and vapor deposition. In order to provide a uniform coating layer also on the outer periphery of the fine pattern, sequential chemical vapor deposition is suitable, and atomic deposition, which is a type of sequential chemical vapor deposition, can be suitably employed.

The sequential chemical vapor deposition is generally a method of laminating an inorganic material layer, and is a method of forming an inorganic material layer by exposing a substrate to at least one, preferably at least two reactive precursors serving as raw materials of the inorganic material layer, and reacting the precursor with a substrate surface, or reacting the precursor on the substrate. Examples of the inorganic material layer formed by this method include an inorganic oxide film layer of $Al_2O_3$, $ZrO_2$, or $HfO_2$, and an inorganic nitride layer of TiN, TaN, or WN. Among them, an alumina ($Al_2O_3$) film is exemplified as a film widely used, and among various methods proposed for depositing a coating layer in this case, the most common method is a method of reacting trimethylaluminum (TMA) with water as a raw material.

In this method, the coating layer can be grown in a substrate temperature range from room temperature to a temperature of 300° C. or higher, and the coating layer is grown by the following mechanism. Specifically, TMA and water are alternately supplied, but during the supply of TMA, TMA is dissociated, and $AlCH_3$ is adsorbed on the substrate surface. Excess TMA is discharged without being adsorbed, and one atomic layer of $AlCH_3$ is formed on the substrate surface. When water is supplied thereto, the water reacts with $CH_3$ groups on the surface to generate $CH_4$ as a by-product, and hydroxylated $Al_2O_3$ remains on the surface. By repeating this cycle, an $Al_2O_3$ layer having a desired thickness is formed on the substrate surface. For example, in the case of $Al_2O_3$, a coating layer of about 3 nm is formed by repeating 20 cycles.

After the coating layer is formed, unreacted substances and moisture may be removed, and a heating step may be performed for stabilizing the coating layer. The heating temperature is not particularly limited, but is preferably 100 to 900° C. from the viewpoint of a temperature that does not affect the fine pattern and a temperature that does not change the structure of alumina.

The thickness of the coating layer is preferably thick from the viewpoint of improving the strength, but is preferably thinner from the viewpoint of miniaturization. In view of the fact that the size of the fine pattern for use in a semiconductor is about several tens of nm, the thickness of the coating layer is preferably 50 nm or less, more preferably 10 nm or less. The lower limit is not particularly limited, but is preferably 0.1 nm or more, more preferably 1 nm or more.

[Method for Manufacturing Reproduced Imprint Mold]

The imprint mold of the present invention can easily remove the coating layer. For example, the $Al_2O_3$ film can be easily removed with a commercially available mixed acid alumina etchant. Therefore, even when the transfer fine pattern is contaminated for some reason or the coating layer formed on the transfer fine pattern is deteriorated, the coating layer can be removed as described above, and the imprint mold can be reproduced by forming the coating layer again on the transfer fine pattern from which the coating layer has been removed by the above-described method. As a result, a reproduced mold can be obtained without damaging the transfer fine pattern provided on the synthetic quartz glass substrate.

As the method for manufacturing the reproduced imprint mold, specifically, for example, a method including the following steps can be adopted.

- (21) Peeling off a coating layer formed on the transfer fine pattern of the synthetic quartz glass substrate (twenty-first step)
- (22) Cleaning the transfer fine pattern from which the coating layer has been peeled off (twenty-second step)
- (23) Confirming that the shape and fracture strength of the cleaned transfer fine pattern are maintained as compared with the pattern before the coating layer is peeled off (twenty-third step)
- (24) Forming a new coating layer on at least a part of the confirmed transfer fine pattern, using the same material as or a different material from the peeled coating layer (twenty-fourth step)

(21) Twenty-First Step

In the twenty-first step, the coating layer formed on the transfer fine pattern of the synthetic quartz glass substrate is peeled off. In this step, it is preferable to use a chemical agent capable of removing the already provided coating layer without affecting the transfer fine pattern. The chemical agent can be appropriately selected depending on the material of the coating layer, and for example, when the coating layer is alumina, a commercially available mixed acid alumina etchant or the like can be applied.

(22) Twenty-Second Step

In the twenty-second step, the transfer fine pattern from which the coating layer has been peeled off is cleaned. In this step, the transfer fine pattern is cleaned, considering that foreign matter or the like is caught. Specifically, in general, methods such as wet cleaning in which an acid for a semiconductor such as an aqueous solution called SC1 or SC2, an alkali, a surfactant and the like are combined, dry cleaning such as plasma, ozone or DUV and the like can be performed in combination.

(23) Twenty-Third Step

In the twenty-third step, the coating layer is peeled off, and it is confirmed that the shape and fracture strength of the cleaned transfer fine pattern are maintained as compared with the pattern before the coating layer is formed. In this step, it is confirmed whether or not there is no breakage or the like in the transfer fine pattern before and after the peeling of the coating layer (before and after the formation of the peeled coating layer), and the transfer fine pattern can be reused without any problem. Specifically, for example, the shape and fracture strength before and after the peeling of the coating layer (before and after the formation of the peeled coating layer) can be confirmed by a method such as time-of-flight secondary ion mass spectrometry or nanoindentation test.

The time-of-flight secondary ion mass spectrometry is a method of identifying an element by irradiating a surface layer of a substrate with ions to generate secondary ions of the substrate, and measuring a mass of a material present on a surface of the substrate from a time of flight corresponding to the mass. The surface state of the substrate can be analyzed from a detection result of the secondary ions.

In addition, the fracture strength (Young's modulus) can be determined by the nanoindentation test.

In the present invention, one of these methods can be used alone or in combination of two or more, but in the present invention, it is preferable to use the nanoindentation test.

In the present invention, the fact that the shape and strength of the transfer fine pattern before forming the coating layer are maintained refers that the fracture strength (Young's modulus) of the peeled and cleaned fine pattern portion by the nanoindentation test is preferably 65 GPa or more, more preferably 70 GPa or more, and the absolute value of the difference from the fracture strength (Young's modulus) of the fine pattern portion before formation of the peeled coating layer is preferably 6 GPa or less, more preferably 5 GPa or less.

If the above conditions are satisfied, it is considered that there is no breakage in the pattern, and a reproduced imprint mold having a desired fracture strength (Young's modulus) can be obtained by forming a new coating layer in the next step.

(24) Twenty-Fourth Step

In the twenty-fourth step, a new coating layer is formed on at least a part of the transfer fine pattern whose shape and fracture strength have been confirmed, using the same material as or a different material from the peeled coating layer. In this step, a coating layer is provided again by using the same method as the method for providing the coating layer described above. The same material as described above can be used as the material of the coating layer.

Preferred ranges of the thickness, variation in thickness, Mohs hardness, fracture strength (Young's modulus), and improvement ratio of the fracture strength (Young's modulus) of the new coating layer as compared with that before coating are all the same as the ranges described for the coating layer before reproduction.

The number of times of reproduction is not particularly limited, and reproduction can be performed any number of times as long as the shape and fracture strength of the pattern after peeling of the coating layer are within the above-described ranges, but the number of times of reproduction is preferably two or more, more preferably three or more.

The imprint mold thus reproduced as described above can be used in the same manner as the imprint mold before reproduction.

EXAMPLES

Hereinafter, the present invention is described more specifically with reference to Examples and Experimental Examples, but the present invention is not limited to the following Examples.

Example 1 Fabrication of Imprint Mold

[Fabrication of Synthetic Quartz Glass Mold for Forming Organic Film by Electron Beam Lithography]

First, an imprint mold used for nanoimprint lithography of an organic film was fabricated. A CrN layer with a thickness of 10 nm was formed on a square synthetic quartz glass substrate with a size of 20 mm×20 mm and a thickness of 0.525 mm by sputtering. Thereafter, a positive electron beam resist (ZEP520A, manufactured by Zeon Corporation) was spin-coated on the CrN layer and pre-baked at 180° C. for 10 minutes to form a positive electron beam resist layer with a thickness of 80 nm. Thereafter, a charge-dissipating agent made from a conductive polymer (ESPACER 300Z, manufactured by Showa Denko K.K.) was spin-coated to form an antistatic layer with a thickness of 10 nm.

Next, a linear pattern with a line width of 100 nm and a space width of 100 nm was subjected to electron beam drawing using an electron beam lithography device (ELS-G125S, manufactured by ELIONIX INC.) to form a latent image. The antistatic layer was removed by cleaning with ultrapure water, and developed by immersing and drying a developer (ZED-N50, manufactured by Zeon Corporation) and a rinse solution (ZMD-B, manufactured by Zeon Corporation) in this order to form a linear pattern having a resist opening exposed to an electron beam and with a space width of 100 nm and a resist balance with a line width of 100 nm unirradiated with an electron beam on the CrN layer.

Next, using an argon ion beam milling system (20IBE-C, manufactured by Hakuto Co., Ltd.), a portion of the resist opening corresponding to the space width where the surface of the CrN layer was exposed was selectively removed to form a hard mask pattern of CrN corresponding to the line width. Thereafter, the surface portion of the synthetic quartz glass substrate not covered with the mask pattern of CrN was etched using propane octafluoride ($C_3F_8$) gas and a dry etching apparatus (EIS-200ER, manufactured by ELIONIX INC.), and immersed in a chromium etchant (manufactured by Hayashi Pure Chemical Ind., Ltd.) to remove the hard mask pattern of CrN, thereby obtaining an imprint mold made of synthetic quartz glass having a linear pattern with a line width of 100 nm and a space width of 100 nm. A release agent FAS13 ((tridecafluoro-1,1,2,2-tetrahydrooctyl) trimethoxysilane) was deposited on the obtained imprint mold.

[Fabrication of Nanoline Structure (Transfer Fine Pattern) of Synthetic Quartz Glass by Nanoimprint Lithography]

Next, a CrN film (inorganic film) with a thickness of 10 nm was formed on a circular synthetic quartz glass substrate with a diameter of 100 mmφ and a thickness of 0.525 mm by sputtering. Thereafter, a photocurable resist was applied onto the CrN film to form a resist film (organic film) with a thickness of 80 nm.

Next, using a nanoimprint apparatus (ImpFlex Essential, manufactured by Sanmei Co., Ltd.), the imprint mold subjected to release agent treatment was pressed to form a resist film, and in this state, the resist film was cured to form a resist film pattern (organic film pattern) as a linear pattern with a line width of 100 nm and a space width of 100 nm on the CrN film. Thereafter, the resist film remaining in the space width portion other than the resist film pattern portion with a line width of 100 nm was removed by an oxygen reactive etching apparatus (IM-TU01, manufactured by National University Corporation Tohoku University), and the surface of the CrN film in the portion where the linear resist film pattern was not formed was exposed.

Next, using an argon ion beam milling system (20IBE-C, manufactured by Hakuto Co., Ltd.), a CrN film in a portion where a linear resist film pattern was not formed and the surface was exposed was selectively removed to form a hard mask pattern of CrN (inorganic film pattern). Thereafter, the surface portion of the synthetic quartz glass substrate not covered with the mask pattern of CrN was etched using propane octafluoride ($C_3F_8$) gas and a dry etching apparatus (EIS-200ER, manufactured by ELIONIX INC.), and immersed in a chromium etchant (manufactured by Hayashi Pure Chemical Ind., Ltd.) to remove the mask pattern of CrN together with the resist film pattern, thereby obtaining a synthetic quartz glass substrate in which a nanoline structure (transfer fine pattern) having a linear pattern with a line width of 100 nm and a space width of 100 nm was formed on the surface portion of the synthetic quartz glass substrate.

The shape and fracture strength of the pattern portion were measured by the following method.

[Coating of Alumina by Atomic Layer Deposition (ALD)]

The surface of the obtained nanoline structure (transfer fine pattern) of the synthetic quartz glass was coated with alumina by ALD. The coated nanoline structure was allowed to stand on a heating seat in a vacuum chamber so that the surface temperature of the synthetic quartz glass substrate was 140° C. ALD was performed for a total of 20 cycles, with exposure of trimethylaluminum as an inorganic precursor for 0.1 s, nitrogen purge and exhaust for 600 s, exposure of water as an oxidant for 0.1 s, and nitrogen purge and exhaust for 600 s as 1 cycle.

The fracture strength of the pattern portion after coating was measured by the following method.

[Removal of Alumina by Wet Etching]

The alumina coating layer formed by ALD was removed by wet etching. The nanoline structure was immersed in a mixed acid aluminum etchant (manufactured by KANTO CHEMICAL CO., INC.) at a liquid temperature of 30° C. for 3 minutes, cleaned with ultrapure water, and dried.

The shape and fracture strength of the pattern portion after drying were measured by the following method.

Example 2 Fabrication 1 of Reproduced Imprint Mold

[Coating of Alumina by ALD]

The surface of the nanoline structure (transfer fine pattern) of the synthetic quartz glass from which the coating layer had been removed in Example 1 was coated with alumina by ALD in the same manner as in Example 1.

The fracture strength of the pattern portion after coating was measured in the same manner as in Example 1.

[Removal of Alumina by Wet Etching]

The coating layer was removed and dried in the same manner as in Example 1.

The shape and fracture strength of the dried pattern portion were measured in the same manner as in Example 1.

Example 3 Fabrication 2 of Reproduced Imprint Mold

[Coating of Alumina by ALD]

The surface of the nanoline structure (transfer fine pattern) of the synthetic quartz glass from which the coating layer had been removed in Example 2 was coated with alumina by ALD in the same manner as in Example 1.

The fracture strength of the pattern portion after coating was measured in the same manner as in Example 1.

[Removal of Alumina by Wet Etching]

The coating layer was removed and dried in the same manner as in Example 1.

The shape and fracture strength of the dried pattern portion were measured in the same manner as in Example 1.

(Strength Evaluation by Nanoindentation Test)

Using a nanoindentation tester (ENT-2100, manufactured by ELIONIX INC.) equipped with a diamond spherical indenter (radius of curvature: 200 μm, manufactured by ELIONIX INC.), a diamond spherical indenter (rigid body) was brought into contact with and pressed into a region where a nanoline structure (transfer fine pattern) of the synthetic quartz glass was formed, so that a part of the nanoline structure (transfer fine pattern) of the nanoline structure (transfer fine pattern) was pressed in the height direction to be plastically deformed. Specifically, the pressing was continuously performed 100 times at the same position at a pressing speed of 5 mN/s and a load of 10 mN.

(Results of Strength Test by Nanoindentation Test Before and After Coating in Example 1)

Young's modulus of a line pattern portion of the synthetic quartz glass before coating was 77.0 GPa.

Young's modulus of an alumina-coated synthetic quartz glass line pattern portion subjected to atomic layer deposition was 83.5 GPa, and an improvement in mechanical strength due to deposition of alumina was recognized.

Young's modulus of a line pattern portion after alumina removal was 75.8 GPa, and a change in Young's modulus before and after alumina coating was confirmed.

These results are shown in Table 1.

(Results of Strength Test of Repeated Reproduction by Nanoindentation Test and Confirmation of Pattern Shape in Examples 1 to 3)

Alumina was repeatedly deposited and removed to obtain Young's modulus of the line pattern portion. The results are shown in Table 1. An improvement in mechanical strength due to alumina deposition by ALD was confirmed.

In Example 1, a decrease in Young's modulus after alumina removal (first alumina removal) as compared with the Young's modulus before alumina deposition (ALD untreated substrate) was recognized, but in Example 2, reproduction of Young's modulus by repeated alumina coating (second ALD) was confirmed.

Also in Example 2, a decrease in Young's modulus after alumina removal (second alumina removal) as compared with the Young's modulus after the first alumina peeling (first alumina removal) was recognized, but in Example 3, reproduction of Young's modulus by repeated alumina coating (third ALD) was confirmed.

From these results, it was confirmed that the pattern shape before forming the peeled coating layer was maintained in all Examples.

TABLE 1

| | Example 1 | | | Example 2 | | Example 3 | |
|---|---|---|---|---|---|---|---|
| Sample | ALD untreated substrate | First ALD | First alumina removal | Second ALD | Second alumina removal | Third ALD | Third alumina removal |
| Young's modulus (GPa) | 77.0 | 83.5 | 75.8 | 85.3 | 71.3 | 86.4 | 72.0 |

Experimental Example 1

(Production of Fine Pattern and Result)

A synthetic quartz glass substrate in which a nanoline structure (transfer fine pattern) having a linear pattern with a line width of 100 nm and a space width of 100 nm was formed on the surface of the synthetic quartz glass substrate was obtained in the same manner as in Example 1.

FIG. 1 shows an atomic force microscope image of the obtained linear line pattern. It was confirmed that a fine pattern with a line width of 100 nm and a height of 115 nm was formed.

Experimental Example 2

(Measurement of Thickness of Alumina Coating Layer and Result)

A synthetic quartz glass substrate having no pattern was coated with alumina under the same operation and the same conditions as [Coating of alumina by atomic layer deposition (ALD)] in Example 1, and the film thickness was measured with a stylus type microfigure measuring instrument (ET4000, manufactured by Kosaka Laboratory Ltd.). The measurement was performed at a measurement force of 5 μN and a speed of 20 μm/s. The film thickness of alumina was about 3 nm.

Japanese Patent Application No. 2021-112078 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An imprint mold comprising:

a synthetic quartz glass substrate having a transfer pattern formed on a surface thereof; and a coating layer formed on at least a part of the transfer pattern by at least one of materials different from the substrate, wherein the coating layer is capable of being removed from the pattern, wherein a fracture strength of a portion of the transfer pattern where the coating layer is formed is higher than a fracture strength of the transfer pattern before the coating layer is formed, wherein the coating layer has a thickness of 50 nm or less, and variation in thickness is within 10% of an average value of the thickness of the coating layer, wherein the coating layer consists of a deposition of an atomic layer of the reaction product of at least two reactive precursors, and wherein the at least two reactive precursors are trimethylaluminum and water, which are reacted on the surface of the substrate to form an $Al_2O_3$ layer, and the coating layer is obtained by heating the $Al_2O_3$ layer formed on the surface of the substrate at a temperature of 100 to 900° C.

2. The imprint mold according to claim 1, wherein the material different from the substrate is a metal, an inorganic oxide, or an inorganic nitride.

3. The imprint mold according to claim 1, wherein the fracture strength of a portion of the transfer pattern where the coating layer is formed is 1.05 times or more of the fracture strength of the transfer pattern before the coating layer is formed.

4. The imprint mold according to claim 2, wherein the material different from the substrate comprises at least one material selected from the group consisting of Cu, Ni, alloy containing Cu and Ni, $Al_2O_3$, $ZrO_2$, $HfO_2$, TaN, and WN.

5. The imprint mold according to claim 4, wherein the material different from the substrate is $Al_2O_3$.

6. The imprint mold according to claim 1, the coating layer has a Mohs hardness of 6 or more.

7. The imprint mold according to claim 1, wherein the coating layer is disposed on the synthetic quartz glass substrate so that the coating layer covers an entire surface of the synthetic quartz glass substrate, on which the transfer pattern is formed.

8. An imprint mold comprising:

a synthetic quartz glass substrate having a transfer pattern formed on a surface thereof; and a coating layer formed on at least a part of the transfer pattern by at least one of materials different from the substrate, wherein the coating layer is capable of being removed from the pattern, wherein a fracture strength of a portion of the transfer pattern where the coating layer is formed is higher than a fracture strength of the transfer pattern before the coating layer is formed, wherein the coating layer has a thickness of 3 nm or less, and variation in thickness is within 10% of an average value of the thickness of the coating layer, wherein the coating layer consists of a deposition of the atomic layer of the reaction product of at least two reactive precursors, and wherein the at least two reactive precursors are trimethylaluminum and water, which are reacted on the surface of the substrate to form an $Al_2O_3$ layer, and the coating layer is obtained by heating the $Al_2O_3$ layer formed on the surface of the substrate at a temperature of 100 to 900° C.

9. An imprint mold comprising:

a synthetic quartz glass substrate having a transfer pattern formed on a surface thereof; and a coating layer formed on at least a part of the transfer pattern by at least one of materials different from the substrate, wherein the coating layer is capable of being removed from the pattern, wherein a fracture strength of a portion of the transfer pattern where the coating layer is formed is higher than a fracture strength of the transfer pattern before the coating layer is formed, wherein the coating layer has a thickness of 3 nm or less, and variation in thickness is within 10% of an average value of the thickness of the coating layer, and wherein the coating layer consists of a deposition of the atomic layer of the reaction product of at least two reactive precursors, and wherein the at least two reactive precursors are trimethylaluminum and water, which are alternately supplied and reacted on the substrate surface by repeating the alternate supply up to 20 cycles to form an $Al_2O_3$ layer, and the coating layer is obtained by heating the $Al_2O_3$ layer formed on the surface of the substrate at a temperature of 100 to 900° C.

10. The imprint mold according to claim 8, wherein the fracture strength of a portion of the transfer pattern where the coating layer is formed is 1.05 times or more of the fracture strength of the transfer pattern before the coating layer is formed.

11. The imprint mold according to claim 8, the coating layer has a Mohs hardness of 6 or more.

12. The imprint mold according to claim 8, wherein the coating layer is disposed on the synthetic quartz glass substrate so that the coating layer covers an entire surface of the synthetic quartz glass substrate, on which the transfer pattern is formed.

13. The imprint mold according to claim 9, wherein the fracture strength of a portion of the transfer pattern where the coating layer is formed is 1.05 times or more of the fracture strength of the transfer pattern before the coating layer is formed.

14. The imprint mold according to claim 9, the coating layer has a Mohs hardness of 6 or more.

15. The imprint mold according to claim 9, wherein the coating layer is disposed on the synthetic quartz glass substrate so that the coating layer covers an entire surface of the synthetic quartz glass substrate, on which the transfer pattern is formed.

* * * * *